United States Patent Office 3,703,361
Patented Nov. 21, 1972

3,703,361
DECAHYDROACENAPHTHENE AS A HIGH ENERGY FUEL
Milton S. Konecky, South Plainfield, N.J., assignor to Esso Research and Engineering Company
No Drawing. Continuation-in-part of application Ser. No. 65,887, Oct. 31, 1960, now Patent No. 3,450,781. This application Oct. 23, 1968, Ser. No. 770,119
Int. Cl. C10l 1/08
U.S. Cl. 44—80       12 Claims

ABSTRACT OF THE DISCLOSURE

Decahydroacenaphthene is both an excellent high energy fuel and coolant in rockets, or in standard jet-engines.

CROSS-REFERENCE TO RELATED APPLICATION

This application is a continuation-in-part of Ser. No. 65,887, now U.S. Pat. No. 3,450,781.

BACKGROUND OF THE INVENTION

The present invention relates to improved high energy fuels, and particularly aviation fuels. Specifically, this invention relates to an improved high energy hydrocarbon fuel for jet propulsion, either in rockets, standard jet engine aircraft or turbine powered automotive vehicles. More specifically, it relates to a jet fuel having a high energy per unit volume, low viscosity at low temperature, high boiling point, low freezing point and high thermal stability.

In jet propulsion, the driving force which propels a body forward is in turn produced by the rearward discharge from the body of a jet which is propelled through a restricted orifice. The jet engine, whether used in a rocket or a plane, may be powered by various types of jet fuels. Initially, the jet engine may utilize a mixture of surrounding air in the combustion of the fuel which it carries. Alternately, the jet engine may carry its own fuel supply and oxygen or other oxidizing agent necessary for combustion, and therefore function independently of atmospheric oxygen. The three basic types of jet engines are well known; they include ram jets, turbo-jets and pulse jets. The ram jet is similar to the turbo-jet but differs in that compression in the former is obtained by the ramming effect of the oncoming air, while in the latter, air is forced into the combustion zone by means of a gas turbine. In the pulse jet engine, compression is obtained by the ramming effect of the oncoming air and the intermittent explosion of fuel which closes the valves in the upstream portion of the combustion zone.

One of the outstanding problems connected with the development of supersonic aircraft is the dissipation of heat from the jet engine. At subsonic speeds, heat can be dissipated to the atmosphere by air-cooling the engine. However, at supersonic speeds, the heat builds up faster than the air can absorb it and therefore other methods for cooling must be used. A preferred method is to utilize the fuel as a heat exchange medium to cool the lubricating and/or hydraulic oils before they are recycled to the engine, and the refrigerant used to cool the cockpit and instruments. In the utilization of conventional petroleum distillate feeds the fuel temperature builds up to such an extent that harmful deposits are formed in the precombustion stage of the fuel system. Thus, these fuel temperatures cause deposits to be formed which interfere with normal fuel combustion as well as temperature control. This thermal stability problem is so serious that it can eventually lead to engine failure of the turbine section due to uneven temperature patterns. It has been found that conventional gasoline anti-oxidants are incapable of overcoming this problem. In addition, in the supersonic jet aircraft the range of flight is directly proportional to the heat of combustion energy per unit volume of the fuel, and therefore a fuel having a high energy per unit volume is also necessary.

DESCRIPTION OF THE PRIOR ART

It is well known that in order to produce an effectively-functioning jet and rocket engine, a great variety of characteristics must be present in the fuels utilized. The essential characteristics which must be found in liquid hydrocarbon fuels for jet and rocket engines have been described in detail in various publications, notably in Report No. ASD TR 61–728, issued in May 1962, by Wright-Patterson Air Force Base, Ohio, entitled, "Future Air Force Requirements for Hydrocarbon Fuel," by J. R. Fultz; and Report No. 650804 of the Society of Automotive Engineers dated Oct. 4, 1965, entitled, "Fuels for Advanced Air-Breathing Weapon Systems," by Churchill, Hager, and Zengel, both of which are herein incorporated by reference.

Of particular importance are the requirements for low freezing point, high heat of combustion per unit volume in volume-limited systems, freedom from unsaturation and good stability against deterioration when stored for extended periods of time.

U.S. Pat. No. 2,765,617 discloses a method of operating a turbo-jet engine by feeding a mixture of air and a hydrogenated polycyclic hydrocarbon mixture into the combustion chamber of the jet engine. The partially and/or substantially completely hydrogenated polycyclic hydrocarbons which are employed as the jet fuel are obtained by the hydrogenation of pyrolized toluene, pyrolized mixtures of benzene and toluene, pyrolized mixtures of xylene, mixtures of ortho- and meta-terphenyl, and mixtures of normally solid hydrocarbons boiling above 350° C. at normal pressure.

These hydrogenated polycyclic hydrocarbons exhibit excellent jet fuel properties when the desired heat of combustion is in the range of about 135,000 B.t.u./gal. However, when the heat of combustion of this jet fuel attains a more desirable level of about 142–145,000 B.t.u./gal., the freezing point of this fuel rises above that level ($< -60°$ F.) which is required for an excellent jet fuel. Consequently, the art is in need of high energy jet fuels which exhibit a high heat of combustion per unit volume while maintaining a low freezing point to avoid solidification of the fuel at high altitudes.

SUMMARY OF THE INVENTION

In accordance with the present invention, it has now been discovered that decahydroacenaphthene is superior in thermal stability and heat of combustion energy per unit volume, while maintaining an extremely low freezing point, to other jet fuels presently known. In addition, decahydroacenaphthene exhibits other beneficial properties as a jet fuel such as: (a) excellent heat dissipation at supersonic speeds which allows a fuel comprising decahydroacenaphthene to be an effective coolant; (b) high boiling point which reduces evaporation losses of the fuel at high altitudes; and (c) low viscosity which permits an even flow of the fuel at low temperatures. Furthermore, an extremely economical process has been developed to supply this fuel from readily-available raw materials.

Recently, it was discovered that butadiene can be trimerized to 1,5,9-cyclododecatriene in the presence of a metallo organo catalyst such as a titanium organo catalyst. A process for preparing the cyclododecatriene is described, for example, in Angewandte Chemie., vol. 69, column 11; 397 (June 7, 1957). According to this process, extremely high conversions and selectivities are obtained to the desired products.

More recently, as is described in U.S. Ser. No, 65,887, U.S. Pat. No. 3,450,781, it was discovered that cyclododecatriene, either pure or as a component in a crude mixture with other reaction products from the trimerization of butadiene, may be reacted with an acid catalyst at temperatures of 50° to 250° C. to obtain acenaphthene, or octahydroacenaphthene or decahydroacenaphthene or various combinations of these products. The unsaturated materials, octahydroacenaphthene and acenaphthene, can be readily hydrogenated to form the desired saturated stable jet fuel, decahydroacenaphthene, in 75 to 85% yields. The hydrogenation step to convert the unsaturated components of the reaction product to decahydroacenaphthene is conducted utilizing conventional hydrogenation catalysts. Temperatures are preferably in the range of from 125° to 300° C. and pressures are preferably in the range of 1000 to 3500 pounds per square inch.

Alternatively, the improved jet fuel of this invention may be prepared directly from a coal tar fraction containing acenaphthene. Decahydroacenaphthene is prepared in this manner by hydrogenating the acenaphthene under conventional conditions. In general, the same hydrogenation catalysts and conditions may be utilized as are described above in connection with the hydrogenation of the unsaturated components of reaction product from the cyclododecatriene isomerization reactions.

It is also within the scope of this invention that the jet fuel of the present invention may also be used as a fuel component in a blend with typical petroleum distillate fractions, e.g., heavy naphthas, gasolines or kerosenes. Thus, it is contemplated that 10 to 60 weight percent of the decahydroacenaphthene material (based on the total fuel) may be mixed with the distillate material. The jet fuel distillates which may be mixed with the present material are in general distillate fuels, naphthas, and blends of these materials having an end boiling point of the final jet fuel of at least 435° F., and preferably greater than 480° F. It will be understood, however, that the jet fuels which are employed according to this invention can contain certain other ingredients, such as alcohols or the like, provided the resulting fuel blend meets the specifications imposed upon jet fuels.

Typical jet fuels improved according to this invention include JP-3, i.e., a mixture of about 70% gasoline and 30% light distillate having a 90% evaporated point of 470° F.; JP-4, a mixture of about 65% gasoline and 35% light distillate—a fuel especially designed for high altitude performance; JP-5, an especially fractionated kerosenes; high flash point-low freezing point kerosene, etc.

This invention will be more clearly understood from a consideration of the following example.

Example 1

Into a reaction flask equipped with stirrer, condenser, thermometer, and dropping funnel was placed 1798 g. of polyphosphoric acid. The acid was heated to 150° C. and 590 g. of cyclododecatriene was added slowly with stirring by means of a dropping funnel. After the addition was completed, the reaction mixture was stirred and heated at 150° C. for 3 hours. At the end of this time the mixture was cooled to 100° C. and then poured into a beaker which contained 2 kg. of ice. The organic layer was separated and the aqueous layer was extracted with successive portions of petroleum ether (900 ml. total). The petroleum ether extracts were combined with the organic layer and this solution was successively washed with water, 10% NaOH solution, water, and saturated NaCl solution. The petroleum ether solution was then dried over anhydrous $MgSO_4$ and the solvent was stripped off under vacuum.

The residue was then distilled under vacuum. The following reaction products were obtained:

Decahydroacenaphthene in 48 mole percent yield
Acenaphthene in 10 mole percent yield
Low melting resin in 25 mole percent yield The decahydroacenaphthene, after being separated from acenaphthene by distillation, was tested for jet fuel properties and the data obtained is shown in Table I. In addition, Table I presents data comparing this material with a decahydroacenaphthene sample obtained by hydrogenating commercial acenaphthene separated from a coal tar fraction. Both of these materials are then compared in Table I against the minimum requirements for an idealized jet fuel.

TABLE I

| | Decahydroacenaphthene prepared from— | | Requirements for idealized jet fuel |
| --- | --- | --- | --- |
| | CDT | Coal tar fraction | |
| Boiling point, ° F | 445–460 | 450–460 | >300 |
| Specific gravity at 60° F | 0.9377 | 0.9548 | ---------- |
| Freeze point, ° F | <−76 | <−76 | <−60 |
| Heat of combustion, B.t.u./gal | 143,000 | 145,000 | >120,000 |
| Burning properties, Luminometer number | 32.6 | 23 | 30 |
| Thermal decomposition temp., ° F | 745 | ---------- | >725 |
| Heat-sink capability, B.t.u./lb. from 100° to 745° F | 487 | ---------- | >450 |

As can be seen from the results set forth in Table I, decahydroacenaphthene exhibits excellent properties for use as a high energy fuel. The high boiling point of decahydroacenaphthene reduces evaporation losses at high temperatures. The low freezing point of this material (below 76° F.) is desirable in preventing the solidification of the fuel at high altitudes. The high heat of combustion per unit volume produced by this fuel is a most important characteristic. A high heat of combustion in volume-limited usage, such as in aircraft, has the advantage of increasing the range of the aircraft. Furthermore, this material has a high thermal stability (thermal decomposition) and a high heat dissipation (Heat-Sink Capability) which allows this fuel to function as an effective coolant.

The foregoing description contains a limited number of embodiments of the present invention. It will be understood that this invention is not limited thereto since numerous variations are possible without departing from the scope of the appended claims.

What is claimed is:

1. In a process for operating a jet engine wherein a fuel is passed to the jet engine and is combusted therein, the improvement which comprises utilizing decahydroacenaphthene wherein decahydroacenaphthene is the fuel or a liquid hydrocarbon fuel component.

2. In a process for operating a jet engine wherein a fuel is passed to the jet engine and is combusted therein, the improvement which comprises utilizing decahydroacenaphthene as a fuel component wherein the amount of decahydroacenaphthene ranges from about 10 to about 60 wt. percent based on total fuel.

3. The process of claim 1 wherein said fuel is decahydroacenaphthene.

4. In a process for propelling a jet aircraft wherein a fuel is stored in a fuel tank and the fuel passed to a jet engine and combusted therein to drive the jet aircraft, the improvement which comprises utilizing decahydroacenaphthene wherein decahydroacenaphthene is the fuel or a liquid hydrocarbon fuel component.

5. The process of claim 4 wherein the amount of decahydroacenaphthene ranges from about 10 to about 60 wt. percent based on total fuel.

6. The process of claim 4 wherein said fuel is decahydroacenaphthene.

7. In a process for propelling a jet aircraft wherein the fuel employed to propel said aircraft is used as a heat exchange medium to cool lubricating oils, hydraulic oils and the refrigerant employed in said aircrtft, the improvement which comprises utilizing decahydroacenaphthene wherein decahydroacenaphthene is the fuel or a liquid hydrocarbon fuel component.

8. The process of claim 7 wherein the amount of decahydroacenaphthene ranges from about 10 to about 60 wt. percent based on total fuel.

9. The process of claim 7 wherein said fuel is decahydroacenaphthene.

10. A jet rocket and turbine fuel comprising a decahydroacenaphthene compound wherein said compound is employed alone or as a liquid hydrocarbon fuel component wherein the amount of decahydroacenaphthene is in the range of from about 10 to about 60 weight percent based on total fuel in admixture with from about 40 to about 90 weight percent of a distillate fuel selected from the group consisting of naphthas, gasolines, kerosenes and mixtures thereof.

11. A high energy hydrocarbon fuel comprising decahydroacenaphthene; wherein the amount of decahydroacenaphthene is in the range of from about 10 to about 60 wt. percent based on total fuel, in the admixture with from about 40 to about 90 wt. percent of a distillate fuel selected from the group consisting of naphthas, gasolines, kerosenes and mixtures thereof.

12. A high energy hydrocarbon fuel consisting essentially of decahydroacenaphthene in admixture with a distillate fuel selected from the group consisting of naphthas, gasolines, kerosenes and mixtures thereof.

References Cited

UNITED STATES PATENTS

| | | | |
|---|---|---|---|
| 2,765,617 | 10/1956 | Gluesenkamp | 208—15 |
| 2,932,942 | 4/1960 | Ecke et al. | 60—206 |
| 2,959,915 | 11/1960 | Dille et al. | 60—206 |
| 2,986,874 | 6/1961 | Di Giorgio | 60—206 |
| 3,032,973 | 5/1962 | Biswell et al. | 60—206 |
| 3,086,355 | 4/1963 | Mickel et al. | 60—206 |
| 3,126,420 | 3/1964 | Bloch et al. | 44—80 |
| 3,132,085 | 5/1964 | Summers, Jr. | 44—75 |
| 3,504,055 | 3/1970 | Andress, Jr., et al. | |
| 3,155,740 | 11/1964 | Schneider | 208—15 |
| 3,231,628 | 1/1966 | Bloch | 208—15 |
| 3,367,860 | 2/1968 | Barnes et al. | 208—15 |
| 3,441,497 | 4/1969 | Boodman et al. | 208—15 |
| 3,493,491 | 2/1970 | Barnes et al. | 208—15 |
| 3,236,764 | 2/1966 | Herder et al. | 208—15 |

OTHER REFERENCES

Merck Index, 8th edition, p. 3, 1968.

DANIEL E. WYMAN, Primary Examiner

Y. H. SMITH, Assistant Examiner

U.S. Cl. X.R.

60—206, 208, 215; 208—15